C. ELLIS.
CEMENTITIOUS PRODUCT.
APPLICATION FILED NOV. 9, 1911.
1,151,515.
Patented Aug. 24, 1915.
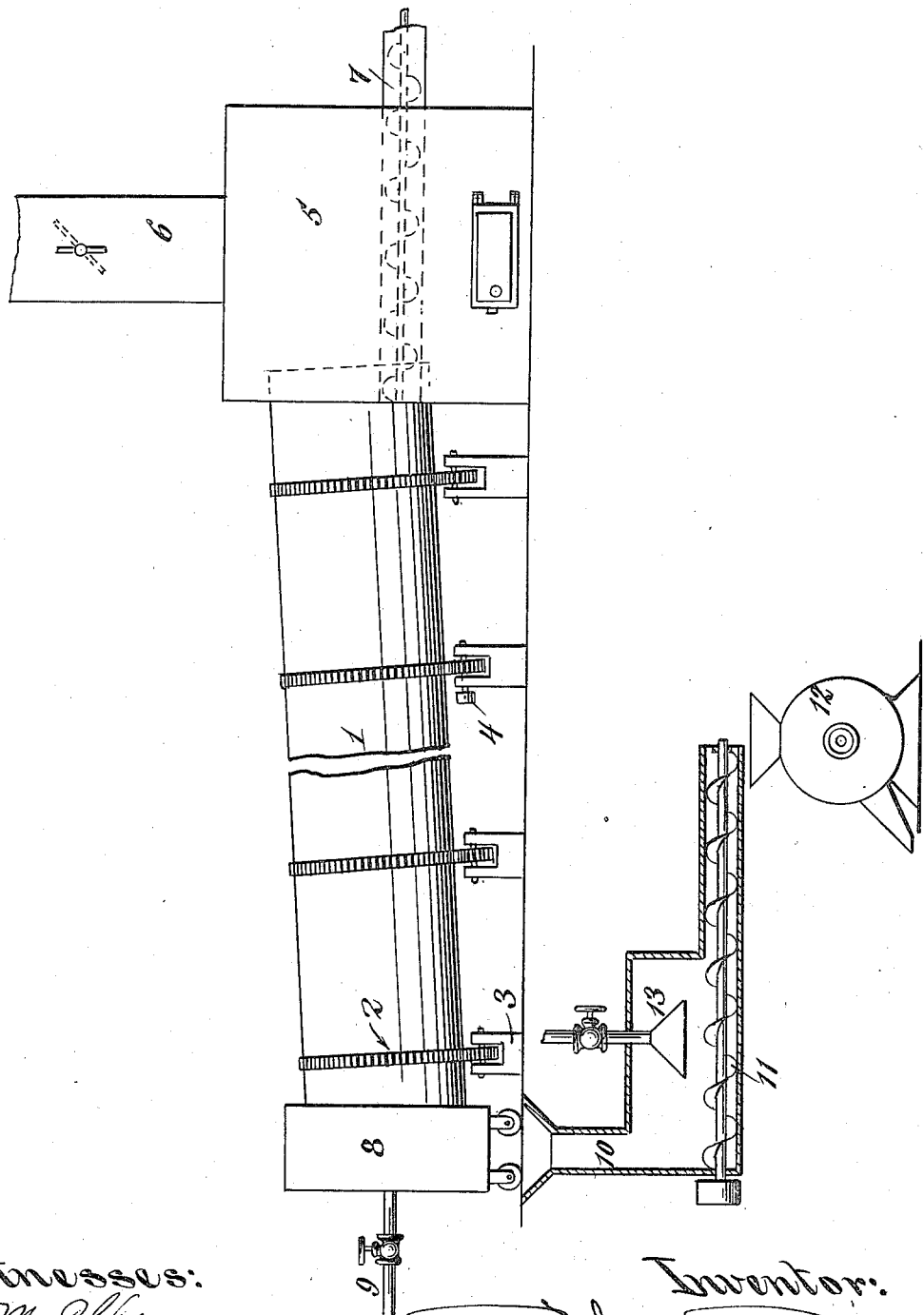

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CEMENTITIOUS PRODUCT.

1,151,515.     Specification of Letters Patent.     Patented Aug. 24, 1915.

Application filed November 9, 1911. Serial No. 659,282.

*To all whom it may concern:*

Be it known that I, CARLETON ELLIS, a citizen of the United States, residing at Montclair, in the county of Essex and State of New Jersey, have invented new and useful Improvements in Cementitious Products, of which the following is a specification.

The invention relates to cement clinker and cementitious products; and it comprises a product new in the art and also involving making ordinary cement clinker in a new, economical and advantageous manner; all as more fully hereinafter set forth and as claimed.

In the most approved method of making clinker, the raw material in the form of a fine dry powder is fed down and through a rotary inclined kiln past a jet of flame of opposed direction, and emerges at the lower end in the form of granular, fritted or sintered aggregates, of a comparatively large size, this size varying with the particular material treated and the operation of the particular kiln used, being sometimes as large as two or three inches in diameter in the case of "easy burning," or "low time" material, which is rather fusible: "hard burning" or high lime, material gives granules of rather less size. In all cases in the ordinary operation, the product is delivered in these vitreous, hard, clinkered or sintered lumps.

It is one of the objects of the present invention to control the size of these clinker granules and also the degree of sintering, since the formation of large hard-burnt granules increases the expense of grinding to form the finished cement.

Another object is to alternatively produce a material of equivalent cementitious properties which will not be in hard clinkered lumps, but in a finer form, more cheaply and easily reduced to an impalpable powder.

The reactions in the formation of clinker as made in the usual way while many and diverse may be here grouped for convenience into two main classes; calcining and clinkering. In the first the raw material loses the carbon dioxid of the carbonates of lime, magnesia, etc., and also the water of hydration of the clay, the latter reaction occurring first in the point of time. During calcination in well regulated operation the organic matters usually present in the clay, are burnt out, sulfids oxidized to sulfates and ferrous compounds converted into ferric. This last named reaction is very important, any irregularity in it meaning irregularity in the quality of the finished cement. Ferrous oxid is a strong base and in cement plays more or less the same role as lime, *i. e.* acts as a base, while ferric oxid has something of the same properties as alumina, viz., may replace part of the acidic constituent, the silica. If therefore, the iron is not always oxidized alike, the resultant cement is apt to vary in properties. One of the reasons for the free access of air in the ordinary operation of the rotary is to secure these oxidations, and it is one of the objects of the present invention to secure this desirable uniformity of oxidation without access of unnecessary air which will result in the loss of heat and waste of fuel. Some 40 per cent. of the weight of the raw materials are lost in calcination, of which a per cent. or two are due to a loss of water, burning of organic material, etc., some are due to dusting losses, and the residue represents a loss of carbon dioxid. For the 380 lbs. of cement in the usual barrel, some 600 lbs. of raw material are introduced into the kiln. Both the expulsion of the water from the clay and that of the carbon dioxid from the limestone are endothermic reactions, absorbing much heat, although not requiring a great intensity or degree of temperature. Like all endothermic reactions requiring the introduction of energy from without they are slow in speed and in this particular instance they are further retarded by the pulverulent form of the material preventing a rapid transmission of heat through it; the more so as the material is giving off relatively cool gases, cool because of the endothermic nature of the reaction, and these tend to retard actual contact of the hot gases of the kiln with the mass. It is for this reason, among others, that the material is best treated in thin, agitated layers, and exposed to a long continued, "soaking" heat, in the endeavor to secure as far as possible a methodical progress of the several reactions occurring; the dehydration, the roasting and the calcining proper. Further, calcination being a reaction depending quite as much upon the character and volume of the ambient gas mass as the sheer amount of heat supplied, to secure efficient calcination much attention must be paid to this point, the gas mass surrounding the calcining material being advantageously large to dilute evolved carbon dioxid as much as possible. For this reason also the treatment in thin agitated layers is best. Liberation of carbon dioxid from calcium carbonate is a reaction depending much upon the amount, or partial pressure of carbon dioxid in the surrounding atmosphere. When this partial pressure is very high, or total, little or no carbon dioxid may escape and the carbonate may simply fuse down or remain unchanged at what would otherwise be a good calcining temperature. It is this phenomenon which is one of the causes of the inefficient calcination in the ordinary rotary where the evolved carbon dioxid, being much heavier than air or hot flame gases, tends to flow along over the top of the calcines retarding development of more dioxid. With a suitable gas mass bathing the calcines, calcination may be efficiently performed at quite low temperatures. In some degree, the temperature and the volume of indifferent gas bathing calcining limestone are reciprocal factors.

The conditions necessary for the clinkering group of reactions, are radically different from those just described. Here there is less necessity for great amounts of heat or a large volume of gas, but the degree of temperature must be higher; high enough to cause the quicklime formed in calcination to enter into reaction with the admixed silicates to form the peculiar silicates and aluminates whose presence in cement gives it its settling properties. It is necessary to furnish a temperature which will finally cause the argillaceous silicates to enter into incipient fusion, vitrification or sintering. But probably no great amount of heat is absorbed in clinkering, the reaction being often probably indeed exothermic; evolving heat; though this evolution does not compensate for the losses by heat radiation, etc., from the kiln. However, no great volume of heat is required in clinkering.

The clinkering reaction is always preformed as one stage in the ordinary kiln, all the divers clinkering actions taking place within direct radiative reach of the clinkering or sintering flame. In the present invention, it is however split up into a plurality of stages. The reaction between the lime and the clay begins some time prior to the clinkering into hard lumps and by careful control of the conditions in the hereinafter described manner, a union sufficient to make a good cement may be effected prior to the actual clinkering or sintering into the ordinary hard clinker nodules or lumps. This uniting reaction, which may be called association, results in the production of a finely granular material of a more or less porous, unclinkered nature, which may be readily and cheaply ground to the impalpable powder necessary for cement and which has, in such condition, good setting powers. It is usually of a yellowish or brownish hue in lieu of the ordinary bluish hue of the finished clinker. Where ordinary clinker is desired it is also advantageous to go through the formation of this preliminary or intermediate product since with all the associating reactions performed, when the material comes under the final heat radiating influence of the clinkering flame a thorough uniform clinkering is quickly effected.

In the ordinary practice, both calcining and clinkering, despite their differing character and requirements are performed in the rotary kilns, the heat for clinkering and the hot gases for calcining being furnished by a flame of powdered coal and air injected into the clinkering end of the kiln. In its standardized form, the rotary is about 60 to 100 feet long, rarely more; is in the neighborhood of 5 ft. internal diameter, and is provided with a short broad stack, seldom more than 60 to 80 feet high. None of these dimensions are arbitrarily chosen; each is inter-dependent on the other and on the ordinary accepted methods of operating the kiln. They are, as a matter of fact, compromises between conflicting requirements among which thermal and chemical conditions have been little considered, save in the matter of furnishing a sufficiently high temperature in the clinkering zone of the kiln. The diameter, for instance, is a compromise between output and coal consumption, extensive experience having shown that increases in diameter require much more fuel per barrel of cement. And with the width is correlated the length. There are a number of cooperating reasons for this correlation between width and length, and the limitation of both in the ordinary practice. One is that since the hot gases tend to rise in the arch of the kiln in the calcining zone, this tendency being reinforced by the presence of an underflowing current of cooler air and carbon dioxid, five feet in the calcining zone represent about the greatest practicable distance through which these gases will impart useful amounts of heat to the calcining material beneath. And by the time the gases have traveled 60 ft. longitudinally of the kiln, though still at a temperature well in excess of 1500 degrees F., they are yet not hot enough to do further work under these circumstances, and are discharged. It is obvious that under these circumstances extra length is not worth its expense. Besides, such extra length disturbs the carefully adjusted draft relations of the coal flame in the clinkering zone. While some heat is imparted by the hot gases to the arc of the kiln which upon rotation becomes the bottom in its turn, this has no very important heating effect upon the calcining material, the refractory kiln lining not being well adapted to impart heat by combustion, nor the powder to receive it. The resultant heat losses are, as is well recognized in the art, inordinate. Over 100 pounds of coal are used per barrel of finished cement, (380 lbs.) in lieu of the less than 25 lbs. indicated by thermochemical data. The convenience and economy otherwise of the rotary kiln have lead it to supersede older processes handling slurry and operating discontinuously, but the waste of fuel it involves, as stated, is well known. Coal costs less than labor and the rotary kiln gives a large output with a minimum of labor. In the clinkering zone of the kiln the conditions usually maintained represent still further compromises. There are few cheap fuels capable of yielding the high temperature here required; viz., one high enough to cause the incipient fusion or sintering of the silicates, etc., which will enable their reaction with the quicklime. Of these the most eligible has been so far a burning jet of powdered coal carried in suspension in an air current, and it is the one which has hitherto been generally used. Unfortunately, the temperature required to frit clay is but little below that at which kiln linings are damaged or below that at which clinker fuses and the coal flame oversteps this margin. Consequently it has usually been deemed necessary to direct the flame axially of the kiln, permitting no direct impingement, and tempering the heat somewhat by a sheath of air surrounding the flame and shielding kiln walls and clinker therefrom. Here again the conventional five feet diameter becomes an important factor, for the cross-sectional area of the flame increases at a greater rate than its most important part, its radiating circumference, and with greater diameters, the amount of coal required to produce a sufficient flame rapidly increases. To furnish this heat-tempering sheath of air, an unnecessary excess is often allowed to enter into the kiln representing another waste of fuel. Furthermore the usual kilns and method are only adapted to handle raw materials; preferably those of minimum bulk. The calcining zone is not able to handle as much material as the clinkering zone, since, as stated, calcination is comparatively slow and clinkering is comparatively quick, and since the material must be in thin layers. Marl-clay mixtures take up too much room in the calcining zone, and the ordinary kiln simply cannot deal with enough material in such mixtures to give the normal output. For this reason a number of plants built to treat marl have had to abandon it and substitute limestone; in some cases hauling the latter material long distances with large supplies of marl available. In certain of these trials, the same amount of coal with the same number of cubic feet of raw material produced twice as much clinker with the limestone-clay mixture as with the marl mixture; or, to state it in another way, the marl mixture required twice as much coal and twice as much labor, time, etc., as the other.

From the foregoing, it will be obvious why the ordinary kiln, though ordinarily regarded as a fairly good clinkerer is a most insufficient calciner and why it is wasteful of fuel. The clinkering section represents too great a fraction of its length and the hot gases are not well utilized in the short calcining zone. Calcination is a reaction requiring a comparatively long time; it requires a high time contact factor. And, even were they better utilized, the time given the material in its passage through the calcining zone would still be altogether too short. In a 60 foot kiln the clinkering zone occupies perhaps 20 ft. or about one-third, only 40 ft. or less being devoted to calcining. This gives the material far too little time for calcining. Longer kilns run under the usual conditions do not give more, for reasons stated. The result is that the material enters the clinkering zone only partially calcined, complicating the clinkering action by the necessity of direct expulsion of carbon dioxid by silica, etc., a reaction absorbing much heat and producing a sudden chilling at this point which tends toward ring formation in the earlier stages of clinkering, and irregularity of product. Agglomerated bodies of the material are apt to form with an exterior sintered shell, causing what is called a "nigger-head" and through this shell the heat penetrates imperfectly, the material not being conductive and the endothermic calcining reaction within opposing heating. This is a frequent source of under-burning. If the clinkering heat be forced to convert these masses, the clinker is very apt to be locally overburnt.

In the present invention the stated disadvantages of ordinary kilns and methods are obviated and certain new advantages are secured, such as greater fuel economy, economy of labor by enabling a single kiln to do the work of several, the ability to use any fuel or raw material, and the securing of an enormous output of higher grade, free from under burnt, or overburnt clinker; all through the ability to obtain the stated new intermediate product constituting a part of the present invention. For this purpose, I have rearranged the conditions of operation, departing altogether from conventional dimensions and conditions with the result of securing a better and a much more even and economical operation. In lieu of passing a quick draft of intensely hot gases above the calcining material in the effort to make high temperature compensate for the lack of bulk of gas in contact with the material,—for the lack of the time contact factor—I present to the said material a large volume of hot gas in actual contact therewith and preferably in comparatively gentle movement and secure the time contact factor either by lengthening the path of the solid moving material or by retarding the velocity of the gases passing the same, or by both together, enabling the dilution and diffusion of the carbon dioxid as fast as formed by preventing the usual stratification of the gas currents. My flame gases, as a matter of fact, I preferably hold in contact with the material for a length of time sufficient to insure that their temperature shall be reduced to the minimum necessary for securing natural draft, or, say 400 degrees F., thereby saving the enormous waste of heat of the usual methods. And since these gentle movements of gases do not tend to pick up dust as does the inordinate velocities obtained under the usual practices, I am enabled to use the ordinary chimney stacks in lieu of the specialized, dust-collecting, short, wide stacks of the prior art, or I may even use mechanical draft means, in case still lower temperatures in the waste gas are desired, utilizing the heat in driers, or elsewhere. By removing the gases at these low temperatures no regenerators are necessary, the kiln being its own heat saver, though they may of course be used if desired, the gases often being practically dustless. If clinkering is carried to the vitrifying stage, a quick draft is as necessary as before in the clinkering zone, both to secure intense combustion and great heat and to support the relatively greater mass of the burning coal, but here also by certain expedients I am able to economize on the amount of air which must be introduced and therefore heated, thereby saving fuel. In making the product of the present invention I preferably also dispense with the conventional air sheath around the flame so far as possible. If a completely sintered and vitrified product is desired, I arrange the conditions to produce a special clinkering zone of the usual length, or perhaps four or five feet longer, say 25 feet, maintaining it in a zone beginning somewhat back of the mouth of the kiln. In lieu of directing the flame axially, I may impinge directly, lessening the amount of coal which must be used to produce the temperature and I aim to obviate local overheating by a more rapid rotation of the kiln. This rapid rotation, which may be in excess of one revolution per minute, carries the clinker up on the side of the kiln, and I can therefore impinge by a sidewise direction of the flame.

I prefer to restrict the amount of air going into the kiln to approximately that necessary for combustion, using a hood at the clinkering or lower end and allowing in the air supplied to the jet for the amount necessarily entering through sight holes, patching holes, etc., thereby saving fuel and also preventing stratification to some extent.

In the usual operation of the ordinary kiln there is a violent rush of hot flame gases along the crown of the kiln and a concomitant inflow of colder air beneath these gases and over the materials being treated, through which air the heat must be transmitted. As calcining is endothermic, this difference in temperature and this stratification tend to be preserved throughout the length of the kiln. And I control the conditions so that intermediate the clinkering and calcining zone. I establish and maintain an associating or combining zone wherein the calcined material undergoes transformation into pulverulent incipient material under prolonged exposure to the penetrating heat and surface action of the light of the incandescent flame gases from the clinkering zone proper. Since powders as such ordinarily react very slowly for the present results, the associating zone must represent a comparatively large fraction of the total kiln length. And it must be supplied with material substantially completely calcined. In the present invention means are accordingly provided to bring about to a very substantial extent reactions which have been heretofore been looked upon as impossible of attainment except in the enormously high temperature of the clinkering zone while the material was undergoing partial fusion.

Contrary to the prevalent belief, it is possible by the proper application of heat (and light under high temperature conditions) and by securing the proper time element or time contact of the heat, (and light) to accomplish in a large degree in the associating zone the reactions ordinarily taking place in the clinkering zone, and too, without the disadvantage of seriously hardening the material by partial fusion or vitrification. This affords the marked advantage that the operation of the clinkering zone proper is rendered much more rapid and efficient and proceeds at a relatively lower temperature. Or what is the same thing, with a flame of a certain temperature, in the clinkering zone proper, much more, "associated" material will be clinkered than ordinary calcines. Thereby a greater output with attendant reduction in fuel cost is secured. Furthermore, by conducting certain of the reactions ordinarily carried out in the clinkering zone under vitrifying, (rather than true clinkering) conditions, the finished clinker may be turned out in a much more porous or even friable condition than where clinkering has to be carried to the extreme to produce sound cement. Thus one great element of cost, that of grinding the vitrified material, or clinker to make cement, may be materially reduced. Also the clinker may be ground to a greater degree of fineness than is customary without excessive cost. As only the finer portions of cement are instrumental in conferring cementitious properties to the product, it will be evident that the present invention tends to reduce the great waste of material through the presence in ordinary cement of coarse particles possessing little or no cementitious properties.

It will be seen that in the zone beyond the clinkering zone heretofore employed substantially solely for the purpose of imperfect calcination I establish wholly new conditions. I lengthen the relative time of contact of the hot gases with the material in the so called calcining zone, as compared with the time of contact with the material in the clinkering zone at least sevenfold; or, which is much the same thing, I lengthen the period of travel of the material therethrough sevenfold as compared with the time of travel through the clinkering zone. This is necessary to secure complete calcination and present the material to the clinkering zone free from carbon dioxid, uniformly heated throughout its mass, and in a high state of association ready for the final transition in the clinkering zone. While in the ordinary kiln of a length of 60 ft. or so, or even in kilns of 150 or 125 ft. in length the clinkering flame has to do much of the calcining to the detriment of the operations in the clinkering zone, in the present invention the operation of calcination is conducted as a substantially separate step under conditions which permit of an intermediate zone wherein association can progress. Hereinafter the term decarbonating zone will be used to designate that portion of the path of travel of material in which the calcining predominates and substantially progresses or completes itself, while that portion of the path wherein association without vitrification substantially occurs is designated as the associating zone. Thus the seven fold exposure area or path of travel beyond the clinkering zone is resolved into two zones, that essentially for decarbonating and that essentially for associating. In this sevenfold portion the best arrangement is a two-fold association zone and a five-fold decarbonating zone, so that the ratio of effective clinkering, associating and decarbonating areas or zones becomes as 1:2:5 depending on the material to be treated, whether "cement rock", marl and clay, slag and limestone, etc., these relations may be modified somewhat to secure the best adaptation. In order to heighten this time-contact factor between raw material and hot gases, however, I also preferably retard the velocity of the latter so that my time contact is really greater than sevenfold. For the sake of convenience however, I shall hereinafter use the word sevenfold as applied to the total length of associating and decarbonating zones, it being understood that this term actually refers to the time of travel of the solid material rather than the true time-contact factor between gases and material, which is much greater and much more important. Using the stated length of clinkering zone, or the space in which the material is exposed to heat radiation from an actively burning vitrifying flame of 25 ft. or thereabout, I make the space between such heat radiating influences of this special character, embracing both the associating and decarbonating zones, or the path of travel of the material therethrough, seven times as long, or longer, or the equivalent of 175 ft. or more. And for the best results the length of the associating zone becomes about 50 ft., and that of the decarbonating zone about 125 ft. or more. In the apparatus hereinafter described, such zones may be maintained under predetermined conditions of flame application, etc., by the use of a novel type of rotary kiln characterized by its enormous length ranging from 200 ft. to 350 ft. or more from end to end, preferably however of a length of about 250 ft. In such an apparatus perhaps ten feet, more or less at the lower end, or at the mouth of the kiln are used for igniting the fuel and as a heat regenerator due to the passage of the incoming air or fuel over the incandescent finished clinker. Beyond this, for a space of 25 ft. or so, is the clinkering zone proper, then follows a space of 50 ft. or more devoted to the secondary clinkering reaction or associating phenomena. The decarbonating zone occupies a space of about 125 to 175 ft. or so, and the remainder of the kiln is taken up by the dehydrating operation, and the heating up of the cold raw material preparatory to entry into the decarbonating zone. It is also of course necessary to secure contact of the hot gases with the material. With the simple long kiln, if some care be taken to avoid stratification of gases at the clinkering zone, and access of air at points throughout its length, this actual contact may be readily secured and also the desired retardation of velocity of flow. Assuming the kiln to be of the same diameter throughout and the gases of a temperature of about 3,000 F. in the clinkering zone and 400 F. at the outlet their volume contracts to be about a fifth, 100 cubic feet becoming about 20. As the cross-sectional area of the kiln is assumed to be the same, this means a corresponding diminution of their translational velocity. I however, preferably increase the diameter of the kiln in the associating and decarbonating zones, slowing down the velocity still more. In the chimney stack, the cross section of the flue can be made appropriate to the new volume to give good draft and the draft in the mouth of the kiln maintained. In other words, I take the moving body of gases throughout such an apparatus, maintaining it in quick motion in the clinkering zone and chimney stack and may slow down its motion in the intermediate associating or decarbonating zones. This slow motion has a number of concomitant advantages; it prolongs the time contact factor with the same length of kiln, permits diffusion of evolved carbon dioxid into the gas mass and prevents stratification, the revolution of the kiln tending to circulate the slow moving gases, in a way not possible with the rapid draft current in the upper part of the kiln in the common operation.

In using a kiln of the character described, it can be made in sections to gain structural strength and rigidity, the sections being telescopically connected or connected by stationary housings, the latter being preferable as permitting more freedom in the matter of diameter. Such a sectional kiln can be made in two or three sections if desired, and each provided with its own drive means permitting differential drive. I prefer to rotate the lower or clinkering end of the kiln rather rapidly to carry the clinker upward on the side, and the upper or decarbonating end rather slowly to increase the time contact factor, inclining the said clinkering section rather less to compensate in the matter of speed of transit therethrough for the increased rapidity of rotation. In this clinkering section the rotation should not be less than one revolution per minute and the inclination may be one-half an inch per foot, while the calcining section may run three-quarters of a revolution and have an inclination of, say, three-quarters inch.

For reasons already stated in regard to gas velocity and for the purpose of securing larger capacity in the decarbonating zone, I prefer to make the latter larger in diameter, than either the associating or the clinkering zones. For example in a three section inclined kiln the upper section employed for decarbonating may be 30 ft. in diameter, the intermediate or associating section 20 ft. in diameter, and the special clinkering section 12 ft. in diameter. I thereby secure ability to treat the voluminous marl mixtures with a normal output, since in calcination shrinkage occurs. With kilns of uniform diameter and with the usual materials, the capacity of the clinkering zone to handle material is greater than that of the calcining and it is well therefore to enlarge the diameter here. This also has the result of forming a sort of "dominant pool" of material. But in no case should the structure of the decarbonating section or the rate of feed be such as to accumulate materials in very heavy, thick layers, since these do not calcine well for stated reasons, unless some special means be adopted to secure gas contact and heat distribution throughout the mass.

In the accompanying diagrammatic drawing I have shown, in elevation, an inclined rotary kiln of enormous length, between 200 and 300 feet, and adapted for the maintenance of clinkering, associating and decarbonating zones, or simply associating and decarbonating zones according to the product required. For high association efficiency the diameter of the kiln is not wholly an unimportant consideration, and a kiln of this length may have a diameter of about 15 ft. in order to afford the proper spread and exposure of the associating material to radiate heat and light; the latter having a probably important, though obscure action in association. A kiln having a diameter of about 30 ft. is better from the point of effective association but difficulties arise in connection with anchoring the lining firmly in a kiln of this diameter, hence the above stated diameter of fifteen ft. On the other hand, the diameter must not be restricted greatly to secure the special products of the present invention. A diameter of six or eight feet for example tends to reduce association to an undesirable minimum and kilns at least 12 ft. in diameter should best be employed to secure the benefits of the substantial institution of associating reactions.

The drawing shows a single inclined rotary kiln of enormous length—200 ft. to 350 ft.—and preferably approximately 250 ft., having a diameter of from 12 to 20 ft., and preferably about 15 ft. The kiln 1, is provided with a housing 5, at its upper end, and a stack, 6, for the withdrawal of the spent products of combustion. The conveyer 7, serves to introduce the raw material, or "mix." At the lower end, the kiln is inclosed by the hood, 8, and as shown is fitted with the powdered fuel blast pipe 9. Raw material is entered into the upper part of the kiln and the powdered fuel jet at the lower end is ignited. With proper fuel and maintenance of proper conditions of combustion, because of the enormous length of the kiln the removal of the carbon dioxid is substantially completed long before the material enters the clinkering zone, while between the calcining and the clinkering zones proper may be produced the described associating zone. The material, with its greatly reduced content of carbon dioxid enters the associating zone where, "dry clinkering" progresses and with a length of zone which makes possible the institution or completion of reactions which in the ordinary kiln would be forced to take place in the clinkering zone. The dry clinkered material at length enters the clinkering zone and there the final reaction of clinkering progresses with remarkable smoothness and thoroughness. Or, if the clinkering operation is to be dispensed with the heating flame is regulated so as to discharge from the kiln a partially fritted mass of associated or combined cement materials, which mass consists of relatively small porous granules possessed of cementitious properties and on further heating being adapted to coalesce into ordinary cement clinker without substantial change of composition.

In prior applications, Serial Nos. 316,148 and 578,664, filed May 10, 1906 and Aug. 24th, 1910, I have described and claimed a process and apparatus for making cement in kilns of enormous length. Such apparatus has been recommended herein for the purposes hereof and without limitation thereby, for it should be understood that the present invention may be practised with various modifications of the apparatus so recommended or with any other suitable apparatus of a totally different character, adapted to yield, as a new article of manufacture, a partially fritted mass of associated materials approximating, that is substantially the proportions of Portland or allied cementitious materials, the components of which are in substantially true combination approximately similar to well-clinkered Portland cement; such cement material being substantially free of carbon dioxid and consisting of, or comprising, relatively soft or porous granules possessed of cementitious properties and said granules upon further heating being adapted to coalesce into cement clinker approximating ordinary vitrified clinker and without any material or substantial change of composition.

What I claim is:—

As a new article of manufacture a partially fritted mass of associated cement materials in substantially the proportions of Portland cement, the components of which are in substantially true combination approximately similar to well clinkered Portland cement; said mass being substantially free of carbon dioxid and consisting of relatively soft porous granules possessed of cementitious properties and said granules on further heating being adapted to coalesce into cement clinker of ordinary vitrified character and without substantial change of composition.

In testimony whereof I affix my signature in the presence of witnesses.

CARLETON ELLIS.

Witnesses:
 WALTER BLADEN,
 NATHANIEL L. FOSTER.